United States Patent
Xiang et al.

(10) Patent No.: US 9,927,912 B2
(45) Date of Patent: Mar. 27, 2018

(54) TOUCH CONTROL DEVICE AND TOUCH DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Junlong Xiang, Xiamen (CN); Min Huang, Xiamen (CN); Yumin Xu, Xiamen (CN); Kangpeng Yang, Xiamen (CN); Wenbin Yang, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 215 days.

(21) Appl. No.: 15/134,849

(22) Filed: Apr. 21, 2016

(65) Prior Publication Data

US 2017/0168635 A1 Jun. 15, 2017

(30) Foreign Application Priority Data

Dec. 14, 2015 (CN) .......................... 2015 1 0928985

(51) Int. Cl.
*G06F 3/041* (2006.01)
*G09G 3/36* (2006.01)
(Continued)

(52) U.S. Cl.
CPC ............ *G06F 3/0416* (2013.01); *G06F 3/044* (2013.01); *G06F 3/0412* (2013.01); *G06F 21/00* (2013.01);
(Continued)

(58) Field of Classification Search
CPC ........ G06F 3/0412; G06F 3/044; G06F 21/00; G09G 3/2096; G09G 3/3266;
(Continued)

(56) References Cited

U.S. PATENT DOCUMENTS 4,205,199 A * 5/1980 Mochizuki .............. G06F 3/046
178/18.03
7,777,727 B2 * 8/2010 Cha ....................... G09G 3/3648
345/173

(Continued)

FOREIGN PATENT DOCUMENTS

CN 102566845 A 7/2012

*Primary Examiner* — Benyam Ketema
(74) *Attorney, Agent, or Firm* — Anova Law Group, PLLC (57) ABSTRACT

A touch control device and a touch display device are provided. The touch control device comprises a plurality of driving electrodes extending in a first direction and divided into a plurality of driving electrode groups arranged in a third direction, a plurality of sensing electrodes extending in a second direction, a plurality of driving units electrically connected to the plurality of driving electrodes and providing driving signals to the driving electrodes, and a sensing circuit electrically connected to the sensing sub-electrodes and detecting output signals from the sensing sub-electrodes. Each sensing electrode includes a plurality of sensing sub-electrodes, a projection of each sensing sub-electrode on the driving electrodes is not overlapped with each other, and a sum of the projections of the sensing sub-electrodes are overlapped with each driving electrode. At least one driving unit is simultaneously electrically connected to at least one driving electrode in each driving electrode group.

20 Claims, 10 Drawing Sheets (51) Int. Cl.
  *G06F 3/044* (2006.01)
  *G06F 21/00* (2013.01)
  *G09G 3/20* (2006.01)
  *G09G 3/3266* (2016.01)

(52) U.S. Cl.
  CPC ......... *G09G 3/2096* (2013.01); *G09G 3/3266* (2013.01); *G09G 3/3677* (2013.01); *G09G 2310/0267* (2013.01); *G09G 2310/0286* (2013.01); *G09G 2310/0291* (2013.01); *G09G 2354/00* (2013.01)

(58) Field of Classification Search
  CPC ......... G09G 3/3677; G09G 2310/0267; G09G 2310/0286; G09G 2310/0291; G09G 2354/00

See application file for complete search history.

(56) References Cited

U.S. PATENT DOCUMENTS

| | | | | |
|---|---|---|---|---|
| 8,325,147 | B2* | 12/2012 | Brand | G06F 3/044 345/173 |
| 8,525,799 | B1* | 9/2013 | Grivna | G06F 3/0416 345/173 |
| 8,836,651 | B2* | 9/2014 | Wang | G06F 3/0416 345/173 |
| 9,389,737 | B2* | 7/2016 | Lee | G06F 3/044 |
| 2002/0084965 | A1* | 7/2002 | Park | G09G 3/3666 345/87 |
| 2005/0243068 | A1* | 11/2005 | Johnson | G06F 3/0412 345/173 |
| 2009/0085891 | A1* | 4/2009 | Yang | G06F 3/044 345/174 |
| 2010/0110038 | A1* | 5/2010 | Mo | G06F 3/044 345/174 |
| 2010/0188345 | A1* | 7/2010 | Keskin | G06F 3/045 345/173 |
| 2014/0132560 | A1* | 5/2014 | Huang | G06F 3/044 345/174 |

* cited by examiner

TOUCH CONTROL DEVICE AND TOUCH DISPLAY DEVICE

CROSS-REFERENCES TO RELATED APPLICATIONS

This application claims priority of Chinese Patent Application No. 201510928985.9, filed on Dec. 14, 2015, the entire contents of which are hereby incorporated by reference.

FIELD OF THE INVENTION

The present disclosure generally relates to the field of touch technology and, more particularly, relates to a touch control device and a touch display device.

BACKGROUND

With the development of touch control display technology, touch display devices have been widely used in people's daily lives. Current In-Cell touch displays are often driven by a time-multiplexing driving method, i.e., the time period of each image frame is divided into a display time period of displaying content and a touch time period of detecting touch signals, and touch electrodes used in the touch time period are multiplexed as common electrodes used in the display time period. Such a driving method satisfies the market demand for thinner and lighter touch displays.

However, as the resolution of the touch displays increases, the time period of each image frame substantially decreases, and the corresponding touch time period also decreases accordingly. Thus, the current In-Cell touch displays may have a low position report rate and a limited touch sensitivity.

The disclosed touch control device and touch display device thereof are directed to solve one or more problems set forth above and other problems.

BRIEF SUMMARY OF THE DISCLOSURE

One aspect of the present disclosure provides a touch control device. The touch control device comprises a plurality of driving electrodes extending in a first direction and divided into a plurality of driving electrode groups arranged in a third direction, a plurality of sensing electrodes extending in a second direction, a plurality of driving units electrically connected to the plurality of driving electrodes and providing driving signals to the driving electrodes, and a sensing circuit electrically connected to the sensing sub-electrodes and detecting output signals from the sensing sub-electrodes. Each sensing electrode includes a plurality of sensing sub-electrodes. A projection of each sensing sub-electrode on the driving electrodes is not overlapped with each other, and a sum of the projections of the sensing sub-electrodes are overlapped with each driving electrode. At least one driving unit is simultaneously electrically connected to at least one driving electrode in each of the plurality of driving electrode groups.

Another aspect of the present disclosure provides a touch display device. The touch display device comprises a first substrate, a second substrate arranged opposite to the first substrate, and a touch control device sandwiched between the first substrate and the second substrate. The touch control device comprises a plurality of driving electrodes extending in a first direction and divided into a plurality of driving electrode groups arranged in a third direction, a plurality of sensing electrodes extending in a second direction, a plurality of driving units electrically connected to the plurality of driving electrodes and providing driving signals to the driving electrodes, and a sensing circuit electrically connected to the sensing sub-electrodes and detecting output signals from the sensing sub-electrodes. Each sensing electrode includes a plurality of sensing sub-electrodes. A projection of each sensing sub-electrode on the driving electrodes is not overlapped with each other, and a sum of the projections of the sensing sub-electrodes are overlapped with each driving electrode. At least one driving unit is simultaneously electrically connected to at least one driving electrode in each of the plurality of driving electrode groups.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

The present disclosure provides an improved touch device or touch-control device. The touch control device may include a plurality of driving electrodes extending in a row direction, a plurality of sensing electrodes extending in a column direction, a plurality of driving units, and a sensing circuit. The driving units may be electrically connected to the plurality of driving electrodes, providing driving signals to the driving electrodes.

The plurality of driving electrodes may be at least divided into a first driving electrode group and a second driving electrode group sequentially arranged, and at least one driving unit may be simultaneously electrically connected to one driving electrode in the first driving electrode group and one driving electrode in the second driving electrode group. The number of the driving units and the number of the driving electrodes may be the same.

Each sensing electrode may include a first sensing sub-electrode and a second sensing sub-electrode. The projection of the first sensing sub-electrode on the driving electrode and a projection of the second sensing sub-electrode on the driving electrode may be not overlapped, and a sum of the projection of the first sensing sub-electrode on the driving electrodes and the projection of the second sensing sub-electrode on the driving electrodes may be overlapped with each driving electrode. The sensing circuit may be electrically connected to the first sensing sub-electrodes and the second sensing sub-electrodes, and may detect output signals from the first sensing sub-electrodes and the second sensing sub-electrodes.

Through configuring at least one driving unit to be simultaneously electrically connected to one driving electrode in the first driving electrode group and one driving electrode in the second driving electrode group, at least one driving electrode included in the first driving electrode group and the second driving electrode group may be scanned twice in a full scanning process. Thus, the position report rate may be increased and the touch sensitivity may be improved. The corresponding touch display device may also have an improved touch sensitivity.

Figure 1:
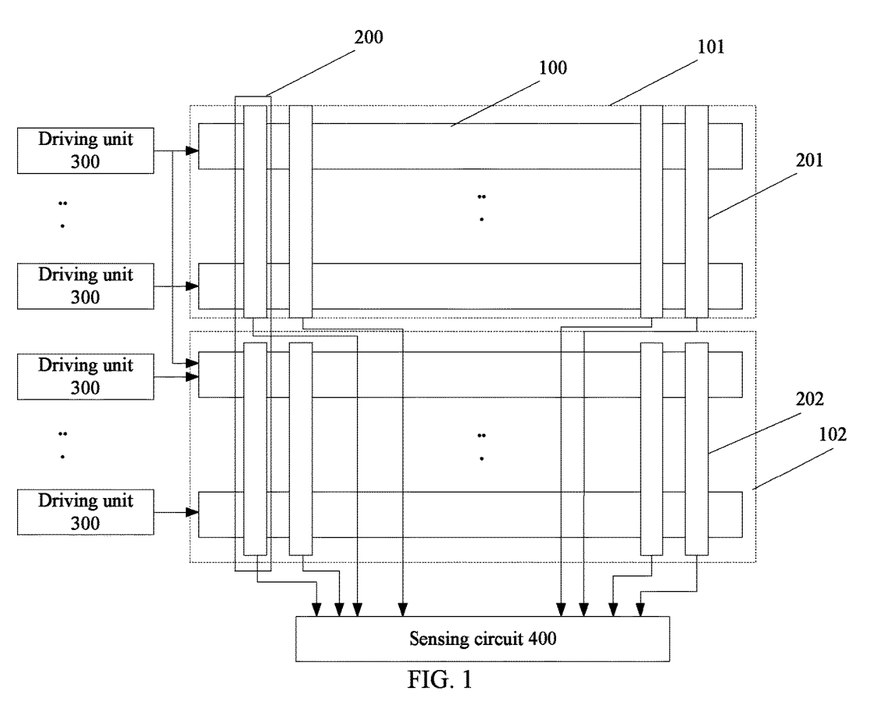
FIG. 1 illustrates a schematic diagram of an exemplary touch control device consistent with disclosed embodiments.

FIG. 1 illustrates a schematic diagram of an exemplary touch control device consistent with disclosed embodiments. As shown in FIG. 1, the touch control device may include a plurality of driving electrodes 100 extending in a first direction, a plurality of sensing electrodes 200 extending in a second direction different from the first direction, a plurality of driving units 300, and a sensing circuit 400. For example, the sensing electrodes 200 may be disposed on top of the driving electrodes 100, and a plurality of touch sensors may be formed by the driving electrodes 100 and the sensing electrodes 200. The proximity of a touch may be determined by detecting a characteristic change, for example, a capacitance change between the driving electrodes 100 and the sensing electrodes 200.

The plurality of driving electrodes 100 may be divided into a plurality of driving electrode groups arranged in a third direction. The plurality of driving units 300 may be electrically connected to the plurality of driving electrodes 100 providing driving signals to the driving electrodes 100, and at least one driving unit 300 may be simultaneously electrically connected to at least one driving electrode 100 in each of the plurality of driving electrode groups.

Further, each sensing electrode 200 may include a plurality of sensing sub-electrodes, in which the projection of each sensing sub-electrode on the driving electrodes 100 may be not overlapped with each other, and the sum of the projections of the sensing sub-electrodes may be overlapped with each driving electrode 100. The sensing circuit 400 may be electrically connected to each sensing sub-electrode, detecting the output signals of each first sensing sub-electrode.

In one embodiment, the number of the driving electrode groups and the number of the sensing sub-electrodes included in each sensing electrode 200 may be the same. In another embodiment, the number of the driving electrode groups and the number of the sensing sub-electrodes included in each sensing electrode 200 may be different.

In one embodiment, as shown in FIG. 1, the first direction may be a row direction (e.g., a horizontal direction in FIG. 1), and the second direction and the third direction may be a column direction (e.g., a vertical direction in FIG. 1). The driving electrodes 100 may be divided into at least one first driving electrode group 101 and at least one second driving electrode group 102 arranged in the column direction.

The number of the driving units 300 and the number of the driving electrodes 100 may be the same. The driving unit 300 may be electrically connected to the driving electrode 100 and, meanwhile, at least one driving unit 300 may be simultaneously electrically connected to one driving electrode 100 in the first driving electrode group 101 and one driving electrode 100 in the second driving electrode group 102. In certain embodiments, the number of the driving units 300 and the number of the driving electrodes 100 may be different.

Further, each sensing electrode 200 may include a first sensing sub-electrode 201 and a second sensing sub-electrode 202. The projection of the first sensing sub-electrode 201 on the driving electrodes 100 and the projection of the second sensing sub-electrode 202 on the driving electrodes 100 may be not overlapped with each other, while the sum of the projections of the first sensing sub-electrode 201 and the second sensing sub-electrode 202 on the driving electrodes 100 may be overlapped with each driving electrode 100.

The sensing circuit 400 may be electrically connected to the first sensing sub-electrodes 201 and the second sensing sub-electrodes 202, detecting the output signals of the first sensing sub-electrodes 201 and the second sensing sub-electrodes 202. The shape of the driving electrodes 100 and the sensing electrodes 200 shown in FIG. 1 is only for illustrative purposes, and is not intended to limit the scope of the present disclosure.

In the disclosed embodiments, the number of the driving units 300 may be the same as the number of the driving electrodes 100, and the driving unit 300 may be electrically connected to the driving electrode 100. In addition, at least one driving unit 300 may be simultaneously electrically connected to one driving electrode 100 included in the first driving electrode group 101 and one driving electrode 100 included in the second driving electrode group 102.

Thus, in a full scanning process of the touch control device, at least one driving electrode 100 in the first driving electrode group 101 and the second driving electrode group 102 may be scanned twice. That is, in the full scanning process of the touch control device, at least one driving electrode 100 among all the driving electrodes 100 included in the first driving electrode group 101 and the second driving electrode group 102 may be scanned twice. The time period of each image frame is divided into a display time period of displaying content and a touch time period of detecting touch signals, and the full scanning process may be referred as the touch time period of detecting touch signals. That is, given a fixed touch time period, the position report rate of the touch control device may be increased, and the touch sensitivity may be improved.

For example, during the full scanning process, the driving units 300 may be controlled to sequentially output a high-level signal (e.g., through a plurality of cascade shift registers), and the driving electrodes 100 electrically connected to the driving units 300 may be scanned when receiving the high-level signal. On the other hand, at least one driving unit 300 may be simultaneously electrically connected to one driving electrode 100 in the first driving electrode group 101 and one driving electrode 100 in the second driving electrode group 102, which may indicate at least one driving electrode 100 in the first driving electrode group 101 and the second driving electrode group 102 may be simultaneously electrically connected to two driving units. Thus, the at least one driving electrode 100 may receive the high-level signal twice and be scanned twice.

Further, the number of the driving electrodes in each driving electrode group may vary. In one embodiment, each driving electrode group may include a same number of driving electrodes. In another embodiment, each driving electrode group may include a different number of driving electrodes. In another embodiment, some driving electrode groups may include a different number of driving electrodes, while the other driving electrode group may include different numbers of driving electrodes.

Figure 2:
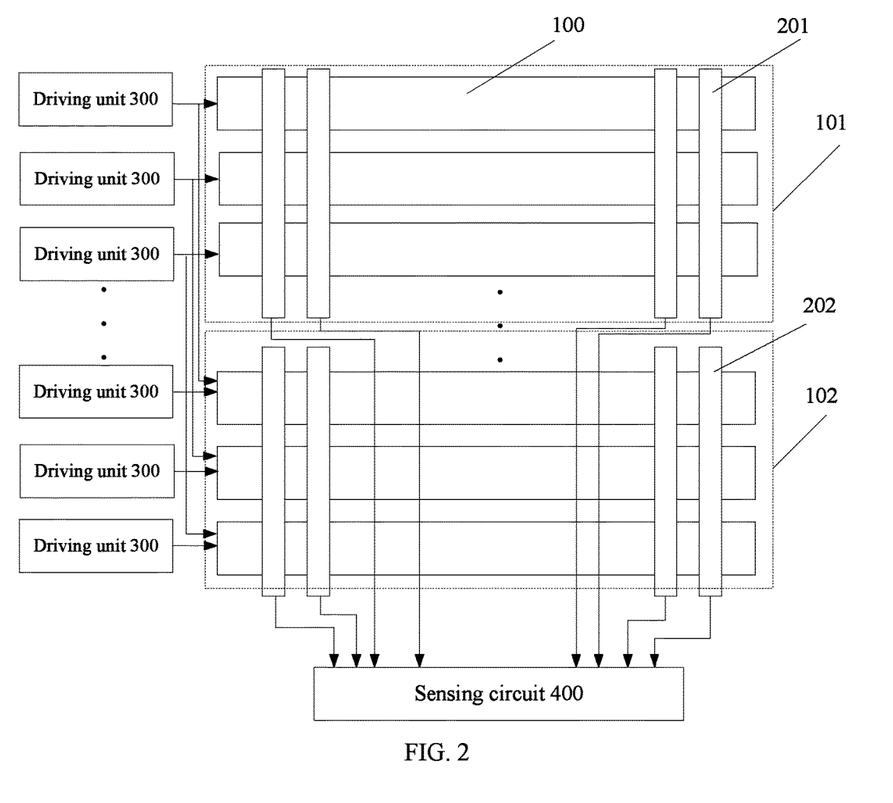
FIG. 2 illustrates a schematic diagram of another exemplary touch control device consistent with disclosed embodiments.

FIG. 2 illustrates a schematic diagram of another exemplary touch control device consistent with disclosed embodiments. The similarities between FIG. 1 and FIG. 2 are not repeated here, while certain difference may be illustrated. As shown in FIG. 2, the first driving electrode group 101 and the second driving electrode group 102 may include a same number of driving electrodes 100. Each driving unit 300 may be simultaneously electrically connected to one driving electrode 100 included in the first driving electrode group 101 and one driving electrode 100 included in the second driving electrode group 102.

Thus, during the full scanning process of the touch control device, each driving electrode 100 in the first driving electrode group 101 and the second driving electrode group 102 may be scanned twice. The position report rate may be doubled and the touch sensitivity of the touch control device may be further improved. In the disclosed embodiments, the number of the driving units 30 may be the same as the number of the driving electrodes 100, and each driving electrode 100 may be simultaneously electrically connected to two driving units 300.

It should be noted that, in certain embodiments, the plurality of driving electrodes 100 may be divided into an N number of driving electrode groups arranged in the third direction, where N is a positive integer larger than 2. Each driving unit may be simultaneously electrically connected to one driving electrode 100 in each of the N driving electrode groups, such that each driving electrode in the N driving electrode groups may be scanned more than twice during the full scanning process of the touch control device. The touch sensitivity of the touch control device may be further improved.

The number of driving electrode groups may be adjusted according to various requirements of the touch control device, such as wiring complexity, touch sensitivity, position report rate, power consumption, and fabrication cost, etc. The disclosed embodiments are still illustrated by dividing the plurality of driving electrodes 100 into the first driving electrode group 101 and the second driving electrode group 102, which is only for illustrative purposes, and is not intended to limit the scope of the present disclosure.

Further, the layout or the arrangement of the driving units 300 in the touch control device, and the electrical connection between the driving units 300 and the driving electrodes 100 may vary according to various fabrication process and application scenarios. In certain embodiments, as shown in FIG. 1 and FIG. 2, all the driving units 300 may be disposed at same ends of the driving electrodes 100, and electrically connected to same ends of the driving electrodes 100, which may be called as "one side driving" or "same-side driving".

Figure 3:
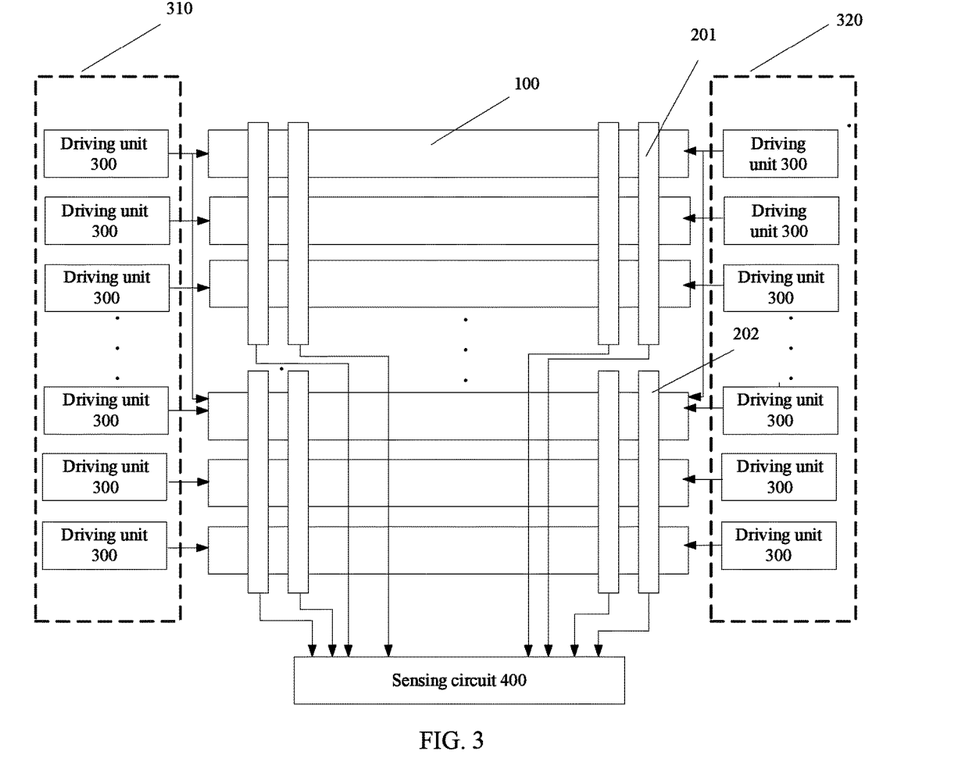
FIG. 3 illustrates a schematic diagram of another exemplary touch control device consistent with disclosed embodiments.

In another embodiment, the driving units 300 may be disposed at both ends of the driving electrodes 100, and both ends of the driving electrodes 100 may be electrically connected to the driving units 300, which may be called as "two sides driving" or "different-side driving". The corresponding structure is shown in FIG. 3. In another embodiment, the driving units 300 may be disposed at both ends of the driving electrodes 100, but the driving electrodes 100 may be alternately activated, which may be called as "interlace driving". The corresponding structure is shown in FIG. 4.

FIG. 3 illustrates a schematic diagram of another exemplary touch control device consistent with disclosed embodiments. The similarities between FIG. 1 and FIG. 3 are not repeated here, while certain difference may be illustrated. Compared to the touch control device shown in FIG. 1, the plurality of driving units 300 shown in FIG. 3 may include a first driving-unit group 310 and a second driving-unit group 320, which may be disposed at two ends of the driving electrodes 100, respectively. The first driving-unit group 310 (i.e., the driving units 300 included in the first driving-unit group 310) may be electrically connected to one end of the driving electrodes 100, and the second driving-unit group 320 (i.e., the driving units 300 included in the second driving-unit group 320) may be electrically connected to the other end of the driving electrodes 100.

In one embodiment, as shown in FIG. 3, the driving units 300 included in the first driving-unit group 310 may be one-to-one corresponding to the driving units 300 included in the second driving-unit group 320, i.e., the first driving-unit group 310 and the second driving-unit group 320 may include a same number of driving units 300. The driving unit 300 included in the first driving-unit group 310 and the corresponding driving unit 300 included in the second driving-unit group 320 may be simultaneously activated.

Figure 4:
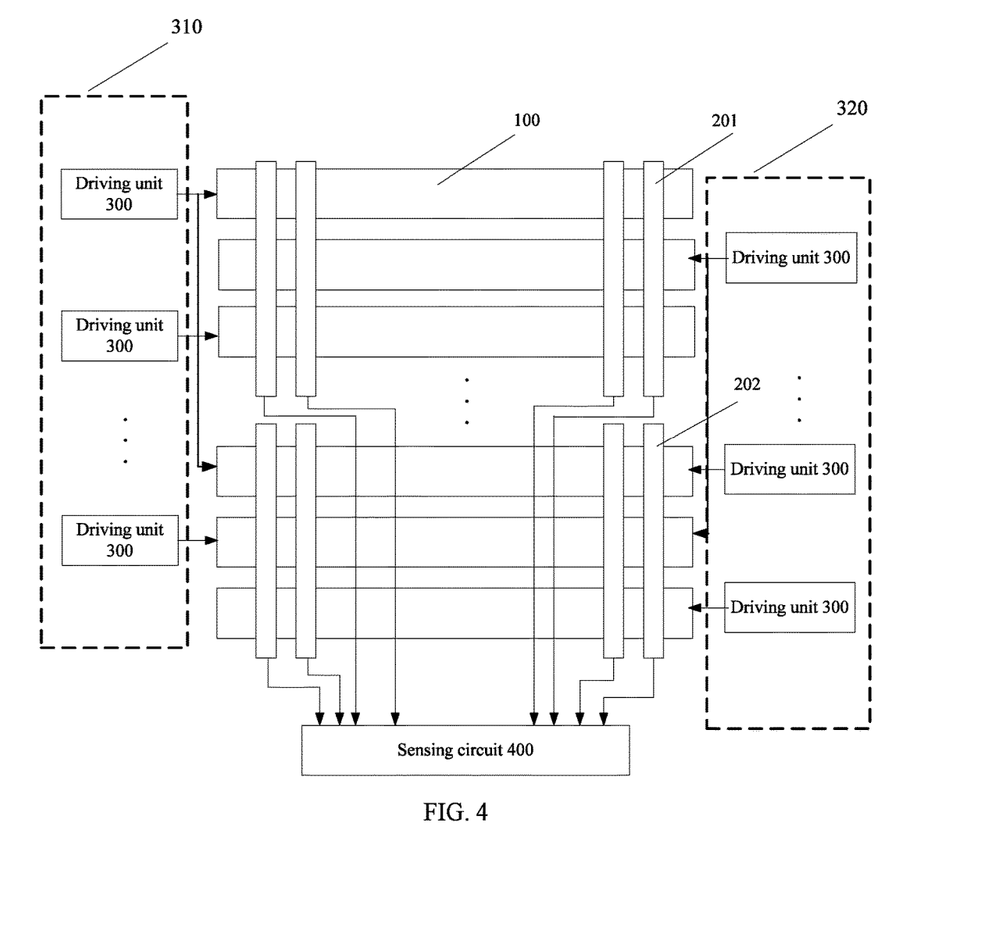
FIG. 4 illustrates a schematic diagram of another exemplary touch control device consistent with disclosed embodiments.

FIG. 4 illustrates a schematic diagram of another exemplary touch control device consistent with disclosed embodiments. The driving unit 300 included in the first driving-unit group 310 and the corresponding driving unit 300 included in the second driving-unit group 320 may be configured to be alternately activated. The similarities between FIG. 4 and FIG. 3 are not repeated here, while certain difference may be illustrated.

As shown in FIG. 4, the plurality of driving units 300 may include a first driving-unit group 310 and a second driving-unit group 320, which may be disposed at two ends of the driving electrodes 100. The first driving-unit group 310 (i.e., the driving units 300 included in the first driving-unit group 310) may be electrically connected to the odd-numbered driving electrodes 100 (e.g., in a top-to-bottom direction in FIG. 4), and the second driving-unit group 320 (i.e., the driving units 300 included in the second driving-unit group 320) may be electrically connected to the even-numbed driving electrodes 100 (e.g., in a top-to-bottom direction in FIG. 4). The driving units 300 in the first driving-unit group 310 and the driving unit 300 in the second driving-unit group 320 may be configured to be alternately activated.

Figure 5:
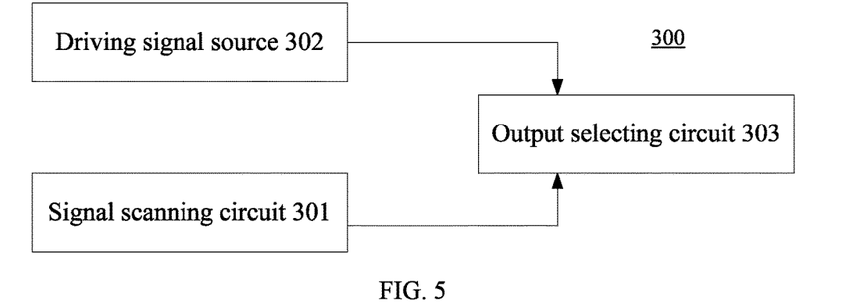
FIG. 5 illustrates a schematic diagram of an exemplary driving unit consistent with disclosed embodiments.

FIG. 5 illustrates a schematic diagram of an exemplary driving unit consistent with disclosed embodiments. As shown in FIG. 5, the driving unit 300 may include a signal scanning circuit 301, a driving signal source 302, and an output selecting circuit 303 electrically connected to the signal scanning circuit 301 and the driving signal source 302. Other components may also be added to the driving unit 300.

In particular, the signal scanning circuit 301 may generate a scanning signal, and the driving signal source 302 may generate a high-level driving signal and low-level driving signal. The output selecting circuit 303 may be controlled by the scanning signal, and output the high-level driving signal or the low-level driving signal to the corresponding driving electrodes, i.e., the driving electrodes electrically connected to the driving unit 300.

Each driving units 300 may require a same high-level driving signal and a same low-level driving signal to drive the corresponding driving electrodes. In one embodiment, referring to FIG. 3 and FIG. 4, the driving units 300 disposed at same ends of the driving electrodes 100 may share the same driving signal source 302, simplifying the structure of the touch control device. In another embodiment, each driving unit 300 may have its driving signal source 302. In another embodiment, some driving units 300 may have their own driving signal sources 302, while some driving units 300 may share the same driving signal sources 302.

Figure 6:
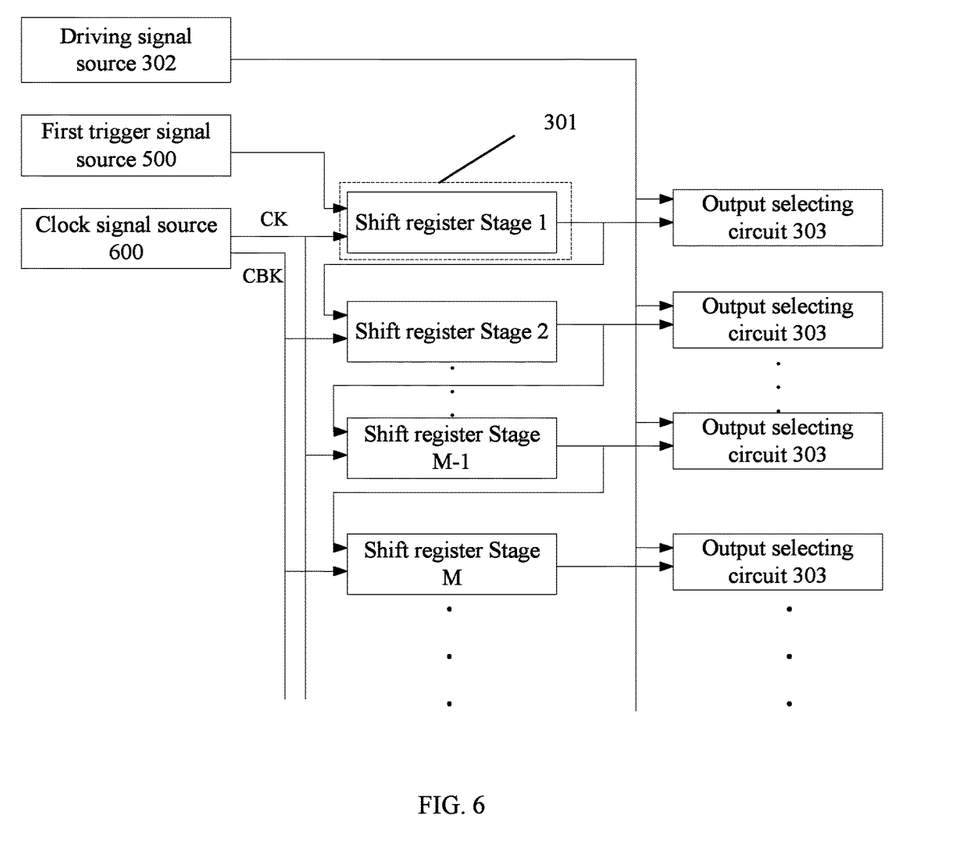
FIG. 6 illustrates a schematic diagram of exemplary driving units consistent with disclosed embodiments.

FIG. 6 illustrates a schematic diagram of exemplary driving units consistent with disclosed embodiments. As shown in FIG. 6, the plurality of driving units may be disposed at same ends of the driving electrodes. Each driving unit may include a signal scanning circuit 301 including a shift register, a driving signal source 302, and an output selecting circuit 303 electrically connected to the signal scanning circuit 301 and the driving signal source 302. The plurality of driving units disposed at same ends of the driving electrode may share the same driving signal source 302. Other components may be also added to the driving unit.

Each shift register may have a trigger signal input terminal for receiving a trigger signal, a clock signal input terminal for receiving a clock signal, and a signal output terminal for outputting the clock signal. When being triggered by the trigger signal, the shift register may output the clock signal through the signal output terminal. The shift registers (Stage 1, Stage 2 . . . Stage M−1, Stage M . . . Stage L) in the signal scanning circuits 301 may be cascaded shift registers, and the $M^{th}$ signal scanning circuit may include the shift register Stage M. L is the number of the signal scanning circuits included in the touch control device, M and L are positive integers, and L≥M>1.

In particular, the shift register Stage 1 in the $1^{st}$ signal scanning circuit 301 may have the trigger signal input terminal electrically connected to a first trigger signal source 500 for receiving a trigger signal, the clock signal input terminal electrically connected to a clock signal source 600 for receiving a clock signal CK, and the signal output terminal electrically connected to the trigger signal input terminal of the shift register Stage 2. The shift register Stage 2 in the $2^{nd}$ signal scanning circuit may have the trigger signal input terminal electrically connected to the signal output terminal of the shift register Stage 1 for receiving a trigger signal, the clock signal input terminal electrically connected to the clock signal source 600 for receiving a clock signal CBK, and the signal output terminal electrically connected to the trigger signal input terminal of the shift register Stage 3.

That is, the trigger signal input terminal of the shift register Stage M may be electrically connected to the signal output terminal of the shift register Stage M−1, and the signal received from the signal output terminal of the shift register Stage M−1 may be adopted as the trigger signal of the shift register Stage M. Further, CKB and CK may be two phase-reversed or inverted clock signals, i.e., the clock signal CKB and the clock signal CK may be a clock signal and a clock bar signal, respectively. That is, the shift registers in the adjacent signal scanning circuits may receive inverted clock signals. Thus, the output selecting circuits 303 may sequentially output a proper signal, for example, a high-level signal, to drive the corresponding driving electrodes.

Figure 7:
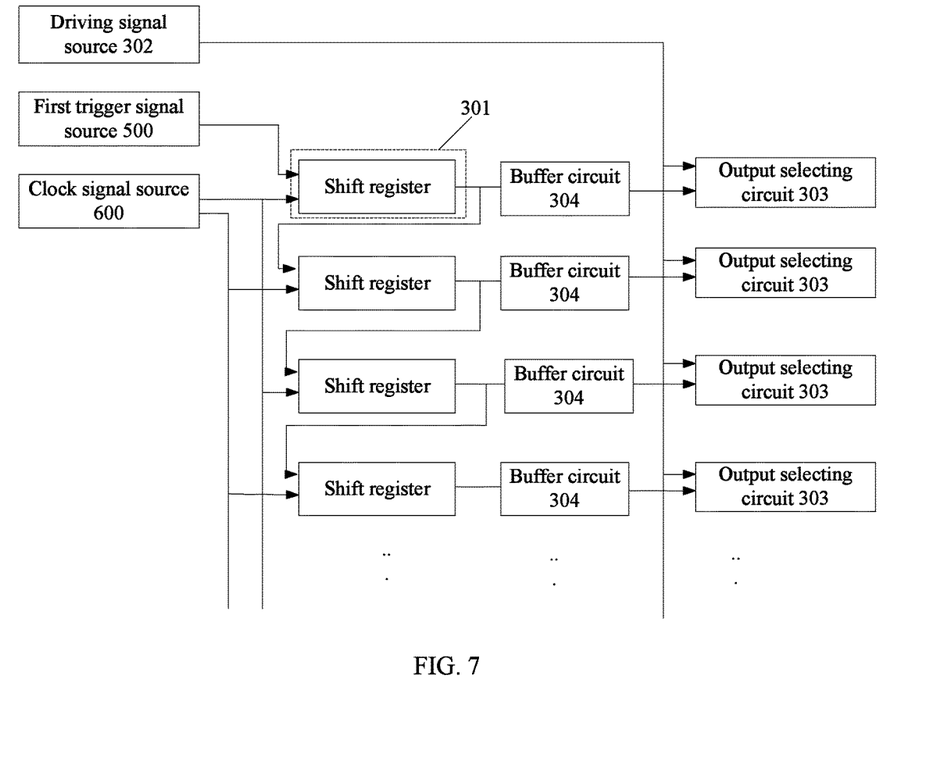
FIG. 7 illustrates a schematic diagram of exemplary driving units consistent with disclosed embodiments.

FIG. 7 illustrates a schematic diagram of another exemplary driving unit consistent with disclosed embodiments. The similarities between FIG. 6 and FIG. 7 are not repeated here, while certain difference may be illustrated. As shown in FIG. 7, each driving unit may include a signal scanning circuit 301 including a shift register, a driving signal source 302, a buffer circuit 304, and an output selecting circuit 303. The buffer circuit 304 may be electrically connected between the output selecting circuit 303 and the signal scanning circuit 301, which may be configured to improve the driving capability of the scanning signal outputted from the scanning signal circuit 301. Other components may be also added to the driving unit.

In one embodiment, the buffer circuit 304 may include an even number of NOT gates. In another embodiment, the buffer circuit 304 may include any appropriate components capable of improving the driving capability of the scanning signal outputted from the scanning signal circuit 301.

Figure 8:
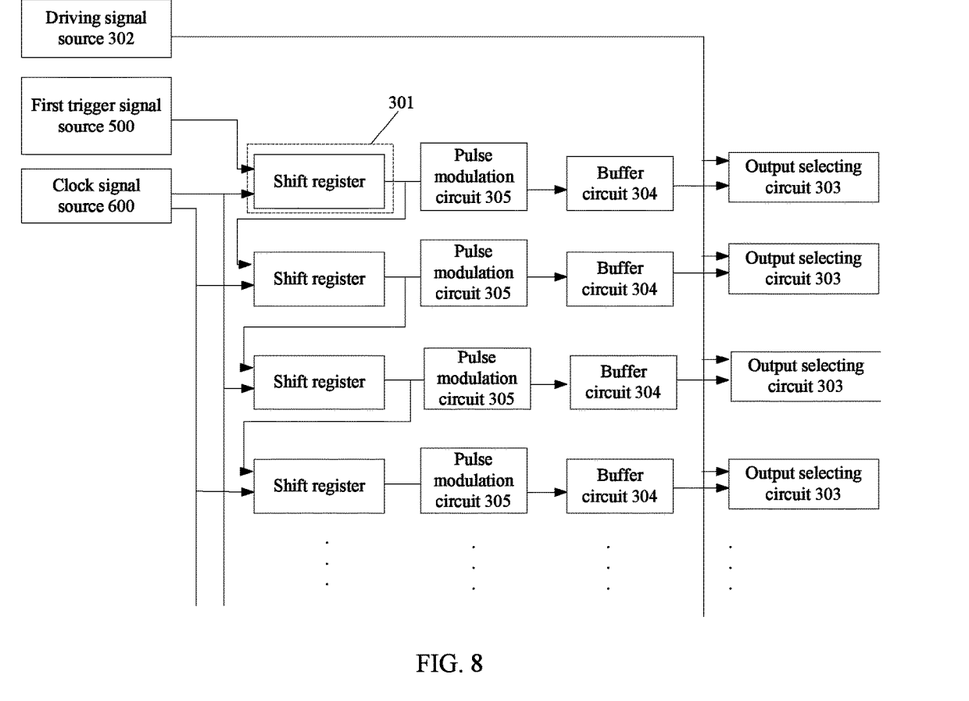
FIG. 8 illustrates a schematic diagram of exemplary driving units consistent with disclosed embodiments.

FIG. 8 illustrates a schematic diagram of another exemplary driving unit consistent with disclosed embodiments. The similarities between FIG. 8 and FIG. 7 are not repeated here, while certain difference may be illustrated. As shown in FIG. 8, each driving unit may include a signal scanning circuit 301 including a shift register, a driving signal source 302, an output selecting circuit 303, a buffer circuit 304, and a pulse modulation circuit 305. The pulse modulation circuit 305 may be electrically connected between the buffer circuit 304 and the signal scanning circuit 301, which may be configured to module the pulse width of the scanning signal outputted from the scanning signal circuit 301. Other components may be also added to the driving unit.

In one embodiment, the pulse modulation circuit 305 may include an AND gate, which may have a first terminal electrically connected to the signal output terminal of the corresponding shift register, and a second terminal electrically connected to the clock signal source 600 for receiving a clock signal. The clock signal received by the second terminal of the pulse modulation circuit 305 and the clock signal received by the corresponding shift register may be two phase-reversed or inverted clock signals. Meanwhile, the buffer circuit 304 may include an even number of NOT gates connected in series and at least two NOT gates connected in series.

In another embodiment, the pulse modulation circuit 305 may include an NAND gate, which may have a first terminal electrically connected to the signal output terminal of the corresponding shift register, and a second terminal electrically connected to the clock signal source 600 for receiving a clock signal. The clock signal received by the second terminal of the pulse modulation circuit 305 and the clock signal received by the corresponding shift register may be two phase-reversed or inverted clock signals. Meanwhile, the buffer circuit 304 may include an odd number of NOT gates and at least one NOT gate. The odd number of NOT gates may be connected in series.

In the disclosed embodiments, the touch control device may include a plurality of diving units, and at least one driving unit may be simultaneously electrically connected to one driving electrode included in the first driving electrode group and one driving electrode included in the second driving electrode group. The driving units may be disposed at same ends of the driving electrodes. Thus, during a full scanning process of the touch control device, at least one driving electrode included in the first driving electrode group the second driving electrode group may be scanned twice. The position report rate and the touch sensitivity of the touch control device may be improved.

Figure 9:
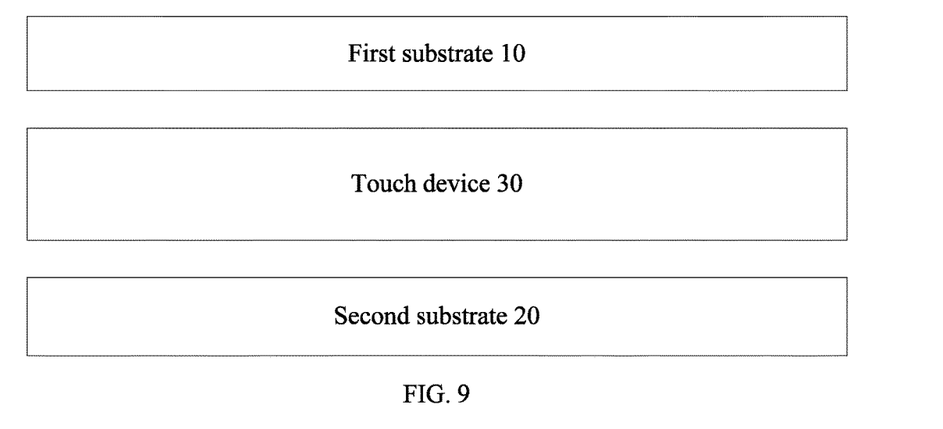
FIG. 9 illustrates a cross-sectional view of an exemplary touch display device consistent with disclosed embodiments.

The present disclosure further provides a touch display device. FIG. 9 illustrates a cross-sectional view of an exemplary touch display device consistent with disclosed embodiments. As shown in FIG. 9, the touch display device may include a first substrate 10, a second substrate 20 arranged opposite to the first substrate 10, and a touch control device 30 sandwiched between the second substrate 20 and the first substrate 10. The touch control device 30 may be any one of the disclosed touch control devices.

The touch display device may be any appropriate type of touch display devices including any one of the disclosed touch control devices 30, such as plasma touch display device, field emission touch display device, liquid crystal touch display device, organic light-emitting diode touch display device, light-emitting diode touch display device, quantum dots touch display device or other types of touch display devices.

For example, the touch display device may be a hybrid in-cell/on-cell liquid crystal touch display device. The touch sensors may be configured to have the sensing electrodes disposed on top (i.e., an outer surface) of the color film substrate of a liquid crystal display (LCD) cell and the driving electrodes disposed inside the LCD cell. For example, the driving electrodes may be disposed on a thin-film transistor glass, or on the inner surface of the color film substrate.

In one embodiment, the touch display device may further include a common electrode and a plurality of pixel electrodes disposed between the second substrate 20 and the first substrate 10. The common electrode and the pixel electrodes may be configured to be display electrodes, i.e., the electrodes for realizing display functions.

In another embodiment, the touch display device may further include a plurality of pixel electrodes disposed between the second substrate 20 and the first substrate 10. The driving electrodes may be multiplexed as touch electrodes (i.e., the electrodes for realizing touch functions) in a touching stage (corresponding to the touch time period), and as common electrodes in a displaying stage (corresponding to the display time period), for example, through a time-multiplexing driving method. The touching stage may be referred as a time period for detecting touch signals, and the displaying stage may be referred as a time for receiving grey scale data signals. That is, when the touch display device is in the touching stage, the driving electrodes and the sensing electrodes may function as the touch electrodes; when the touch display device is in the displaying stage, the driving electrodes and the pixel electrodes may function as the display electrodes. The corresponding touch display device is illustrated in FIG. 10.

Figure 10:
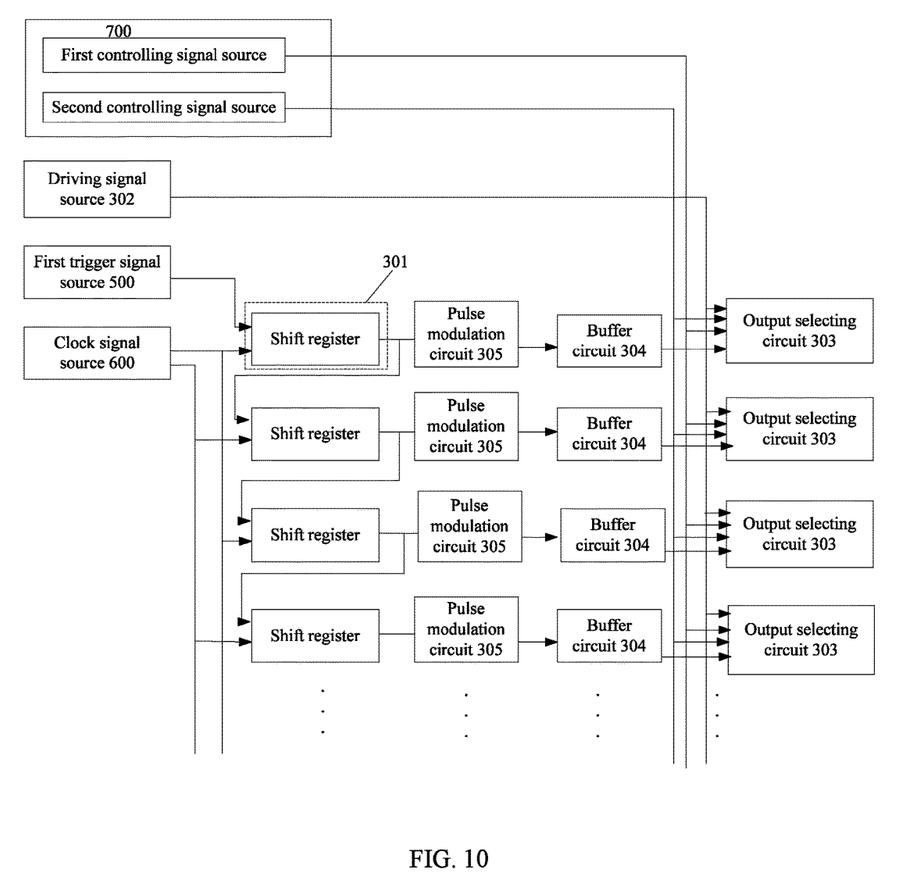
FIG. 10 illustrates a schematic diagram of an exemplary touch display device consistent with disclosed embodiments.

FIG. 10 illustrates a schematic diagram of an exemplary touch display device consistent with disclosed embodiments. The similarities between FIG. 10 and FIG. 8 are not repeated here, while certain difference may be illustrated. As shown in FIG. 10, the touch display device may further include a controlling signal source 700 electrically connected to the output selection circuits 303. The controlling signal source 700 may include a first controlling signal source and a second controlling signal source. Other components may be also added to the touch display device.

When the first controlling signal source outputs a proper high-level signal while the second controlling signal source outputs a proper low-level signal, under the control of the scanning signal from the signal scanning circuit 301, the output selection circuit 303 may selectively output the high-level signal or the low-level signal to the electrically connected driving electrode. The driving electrode may be configured to be the touch electrode.

When the first controlling signal source outputs a proper low-level signal while the second controlling signal source outputs a proper high-level signal, the output selection circuit 303 may output a common voltage signal to the electrically connected driving electrode, and the driving electrode may be configured to be the common electrode.

Thus, when the touch display device is driven by a time-multiplexing driving method, the driving electrodes may be multiplexed as the touch electrodes in the touching stage, and as the common electrodes in the display mode. The structure of the touch display device may be simplified, and the fabrication cost may be reduced. Further, when the touch display device is driven by a time-multiplexing driving method, the output selection circuits may be applicable to the touch display device in both the touching stage and the display mode, further simplifying the structure of the touch display device and reducing the fabrication cost.

Figure 11:
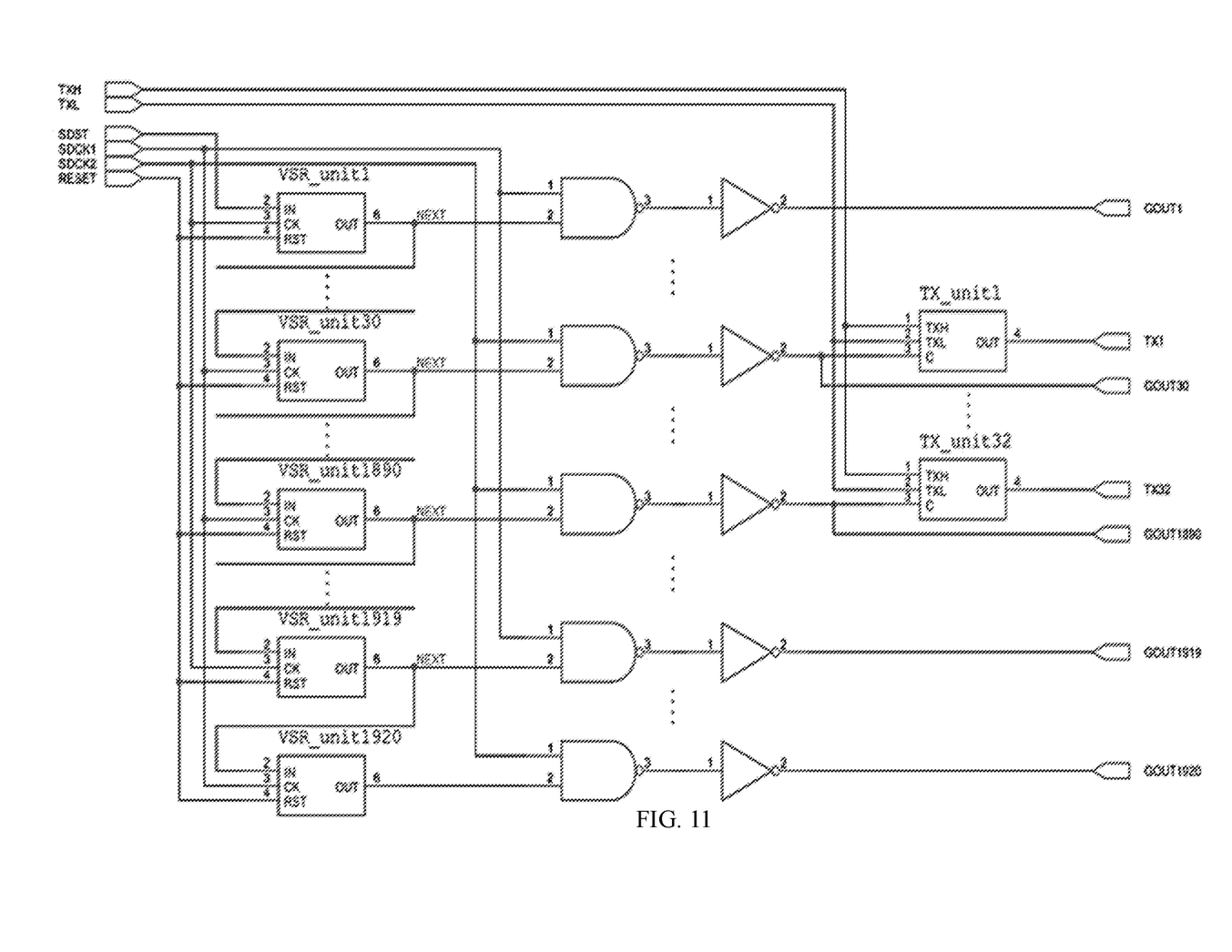
FIG. 11 illustrates an equivalent circuit diagram of an exemplary touch display device consistent with disclosed embodiments.

To be more specific, FIG. 11 illustrates an equivalent circuit diagram of an exemplary touch display device consistent with disclosed embodiments. As shown in FIG. 11, the touch display device may have a 1920*1080 resolution. The touch display device may include 1920 shift registers VSR_unit 1-1920, 1920 pulse modulation circuits 305, 1920 buffer circuits 304 and 32 output selecting circuits TX_unit 1-32. TXH may be a high-level signal controlling source, THL may be a low-level signal controlling source, SDST may be a first trigger signal source, SDCK1 and SDCK2 may be two inverted clock signal sources, and RESET may be a reset signal.

In particular, the signal GOUT(30+60n) outputted from the signal output terminal of the shift register VSR_unit (30+60n) may be transferred to the input terminal C of the output selecting circuits TX_unit (n+1) through the corresponding pulse modulation circuit 305 and the buffer circuit 304, and TX(n+1) may be the signal outputted from the output selecting circuits TX_unit (n+1), where n is an integer, $0 \leq n \leq 31$. The signal GOUT outputted from the signal output terminal of the other shift registers may be directly transferred to the corresponding driving electrodes through the corresponding pulse modulation circuit 305 and the buffer circuit 304.

Figure 12:
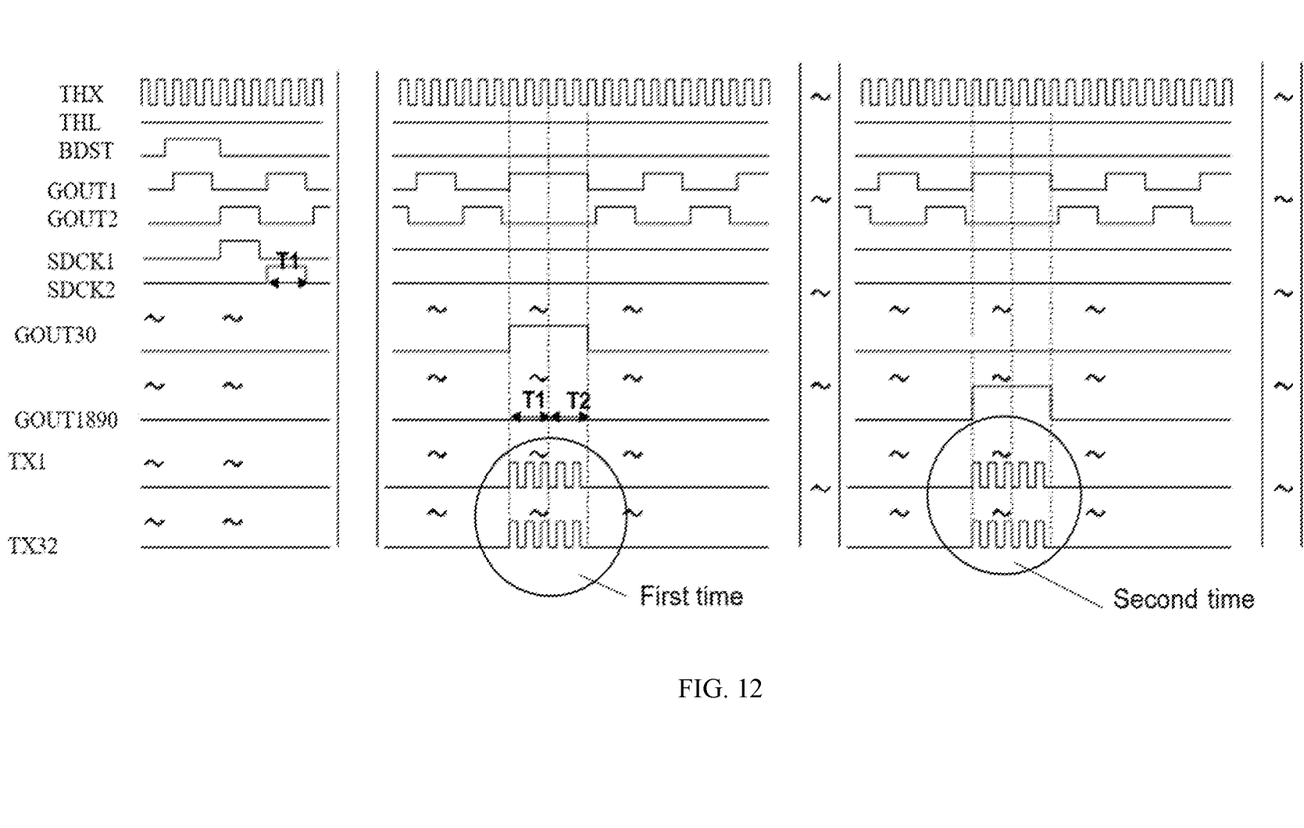
FIG. 12 illustrates an exemplary driving scheme of an exemplary touch display device in FIG. 11 consistent with disclosed embodiments.

FIG. 12 illustrates an exemplary driving scheme of an exemplary touch display device in FIG. 11 consistent with disclosed embodiments. The driving scheme of the touch display device may be illustrated based on the "one side driving" method. When GOUT(30+60n) outputs the high-level signal, TX(n+1) and TX(32−n) may be the high-level signals, otherwise the low-level signals. Thus, during the full scanning process, the driving electrodes receiving TX(n+1) and TX(32−n) may be scanned twice, respectively.

For example, when GOUT30 or GOUT 1890 output the high-level signal, TX1 and TX32 may be respectively the high-level signals, otherwise the low-level signals. During the full scanning process, the driving electrodes receiving TX1 and TX32 may be scanned twice, respectively. T1 may be the period of the high-level signal, and T2 may be the time of full scanning process divided by the number of the driving electrodes receiving TX(n+1) or TX(32−n). The scanning time of each driving electrode receiving TX(n+1) or TX(32−n) may be T1+T2.

In the disclosed embodiments, the touch control device may include a plurality of diving units, and at least one driving unit may be simultaneously electrically connected to at least one driving electrode included in the first driving electrode group and at least one driving electrode included in the second driving electrode group. The driving units may be disposed at same ends of the driving electrodes. Thus, during the full scanning process of the touch control device, at least one driving electrode in the first driving electrode group and the second driving electrode group may be scanned twice. The position report rate and the touch sensitivity of the touch control device may be improved. Accordingly, the touch sensitivity of the touch display device including the touch control device may also be improved.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A touch control device, comprising:
    a plurality of driving electrodes extending in a first direction and divided into a plurality of driving electrode groups arranged in a third direction;
    a plurality of sensing electrodes extending in a second direction, the first direction is a row direction, the second direction is a column direction, and the third direction is the column direction, wherein each sensing electrode includes a plurality of sensing sub-electrodes, and for each sensing electrode, one of the plurality of sensing sub-electrodes overlaps driving electrodes of one group, and another of the plurality of sensing sub-electrodes overlap driving electrodes of another driving electrode group, wherein sensing sub-electrode of one sensing electrode does not overlap driving electrodes of a same driving electrode group;
    a plurality of driving units electrically connected to the plurality of driving electrodes and providing driving signals to the driving electrodes, wherein at least one driving unit is simultaneously electrically connected to at least one driving electrode in each of the plurality of driving electrode groups; and
    a sensing circuit electrically connected to the sensing sub-electrodes and detecting output signals from the sensing sub-electrodes.

2. The touch control device according to claim 1, wherein:
    a number of the driving units and a number of the driving electrodes are the same;
    the driving electrodes are at least divided into a first driving electrode group and a second driving electrode group;
    at least one driving unit is simultaneously electrically connected to one driving electrode in the first driving electrode group and one driving electrode in the second driving electrode group;
    each sensing electrode includes a first sensing sub-electrode and a second sensing sub-electrode, wherein the first sensing sub-electrode overlaps the first driving electrode group, the second sensing sub-electrodes overlaps the second driving electrode group, and the first sensing sub-electrode and the second sensing sub-electrode do not overlap driving electrodes of a same driving electrode group.

3. The touch control device according to claim 2, wherein:
    the first driving electrode group and the second driving electrode group include a same number of the driving electrodes; and
    each driving unit is simultaneously electrically connected to one driving electrode in the first driving electrode group and one driving electrode in the second driving electrode group.

4. The touch control device according to claim 3, wherein:
    each driving electrode is simultaneously electrically connected to two driving units.

5. The touch control device according to claim 1, wherein:
    the driving units are disposed at same ends of the driving electrodes.

6. The touch control device according to claim 1, wherein:
    the driving units includes a first driving-unit group disposed at one end of the driving electrodes and a second driving-unit group disposed at the other end of the driving electrodes.

7. The touch control device according to claim 6, wherein:
    the first driving-unit group is electrically connected to one end of the driving electrodes; and
    the second driving-unit group is electrically connected the other end of the driving electrodes.

8. The touch control device according to claim 6, wherein:
    the first driving-unit group is electrically connected to the odd-numbered driving electrodes; and
    the second driving-unit group is electrically connected the even-numbered driving electrodes.

9. The touch control device according to claim 1, wherein the driving unit further includes:
    a signal scanning circuit configured to generate a scanning signal;
    a driving signal source configured to generate a high-level driving signal and low-level driving signal; and
    an output selecting circuit electrically connected to the signal scanning circuit and the driving signal source, and configured to output the high-level driving signal or the low-level driving signal to the driving electrode electrically connected to the driving unit.

10. The touch control device according to claim 9, wherein the signal scanning circuit further includes:
    a shift register having a trigger signal input terminal for receiving a trigger signal, a clock signal input terminal for receiving a clock signal, and a signal output terminal for outputting the clock signal when the shift register is triggered by the trigger signal.

11. The touch control device according to claim 10, wherein:

an L number of driving units disposed at same ends of the driving electrodes further includes a first trigger signal source configured to output the trigger signal and a clock signal source configured to output the clock signal, wherein the trigger signal input terminal of the shift register in the $1^{st}$ signal scanning circuit is electrically connected to the first trigger signal source, the trigger signal input terminal of the shift register in the $M^{th}$ signal scanning circuit is electrically connected to the signal output terminal of the shift register in the $(M-1)^{th}$ signal scanning circuit, the clock signal input terminals of the shift registers in the adjacent signal scanning circuits receive inverted clock signals, and M and L are positive integers, L≥M>1.

12. The touch control device according to claim 9, wherein the driving unit further includes:
a buffer circuit electrically connected between the output selecting circuit and the signal scanning circuit, wherein the buffer circuit is configured to improve a driving capability of the scanning signal outputted from the scanning signal circuit.

13. The touch control device according to claim 12, wherein the driving unit further includes:
a pulse modulation circuit electrically connected between the buffer circuit and the signal scanning circuit, wherein the pulse modulation circuit is configured to module a pulse width of the scanning signal outputted from the scanning signal circuit.

14. The touch control device according to claim 13, wherein the pulse modulation circuit further includes:
an AND gate including a first terminal electrically connected to the signal output terminal of the corresponding shift register, and a second terminal electrically connected to the clock signal source for receiving the clock signal,
wherein the pulse modulation circuit and the corresponding shift register receive inverted clock signals.

15. The touch control device according to claim 14, wherein:
the buffer circuit electrically connected to the pulse modulation circuit includes an even number of and at least two NOT gates connected in series.

16. The touch control device according to claim 13, wherein the pulse modulation circuit further includes:
an NAND gate having a first terminal electrically connected to the signal output terminal of the corresponding shift register, and a second terminal electrically connected to the clock signal source for receiving the clock signal,
wherein the pulse modulation circuit and the corresponding shift register receive inverted clock signals, and
the buffer circuit electrically connected to the pulse modulation circuit includes an odd number of and at least one NOT gate.

17. A touch display device, comprising:
a first substrate;
a second substrate arranged opposite to the first substrate; and
a touch control device sandwiched between the first substrate and the second substrate,
wherein the touch control device comprises:
a plurality of driving electrodes extending in a first direction and divided into a plurality of driving electrode groups arranged in a third direction;
a plurality of sensing electrodes extending in a second direction, the first direction is a row direction, the second direction is a column direction, and the third direction is the column direction, wherein each sensing electrode includes a plurality of sensing sub-electrodes, and for each sensing electrode, one of the plurality of sensing sub-electrodes overlaps driving electrodes of one group, and another of the plurality of sensing sub-electrodes overlap driving electrodes of another driving electrode group, wherein sensing sub-electrode of one sensing electrode does not overlap driving electrodes of a same driving electrode group;
a plurality of driving units electrically connected to the plurality of driving electrodes and providing driving signals to the driving electrodes, wherein at least one driving unit is simultaneously electrically connected to at least one driving electrode in each of the plurality of driving electrode groups; and
a sensing circuit electrically connected to the sensing sub-electrodes and detecting output signals from the sensing sub-electrodes.

18. The touch display device according to claim 17, further including:
a common electrode and a plurality of pixel electrodes sandwiched between the first substrate and the second substrate.

19. The touch display device according to claim 17, further including:
a plurality of pixel electrodes sandwiched between the first substrate and the second substrate,
wherein the driving electrodes are multiplexed as common electrodes in a displaying stage, and touch electrodes in a touching stage.

20. The touch display device according to claim 19, wherein the touch display device further includes:
a controlling signal source electrically connected to the output selection circuits and including a first controlling signal source and a second controlling signal source,
wherein when the first controlling signal source outputs a high-level signal while the second controlling signal source outputs a low-level signal, controlled by the scanning signal from the signal scanning circuit, the output selection circuit selectively outputs the high-level signal or the low-level signal to the electrically connected driving electrodes, and the driving electrodes are configured to be the touch electrodes, and
when the first controlling signal source outputs the low-level signal while the second controlling signal source outputs the high-level signal, the output selection circuit outputs a common voltage signal to the electrically connected driving electrodes, and the driving electrodes are configured to be the common electrode.

* * * * *